W. C. FARNUM.
CUTTER.
APPLICATION FILED JULY 20, 1917.
1,338,822.
Patented May 4, 1920.
3 SHEETS—SHEET 1.
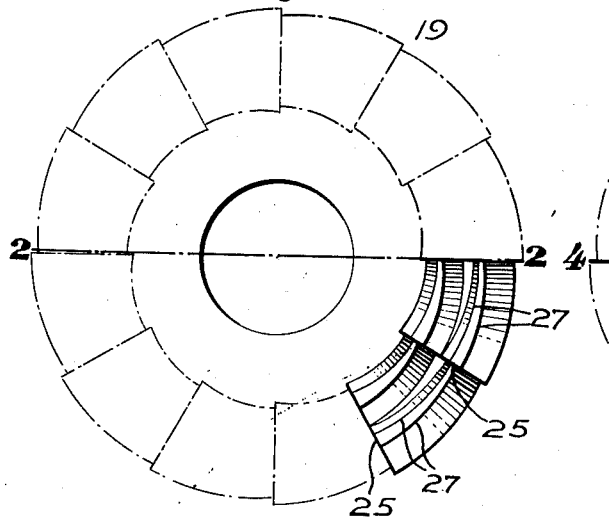
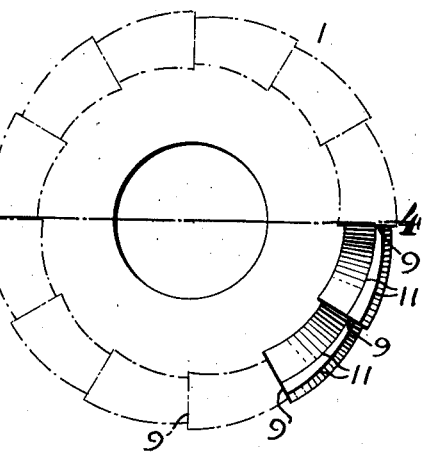
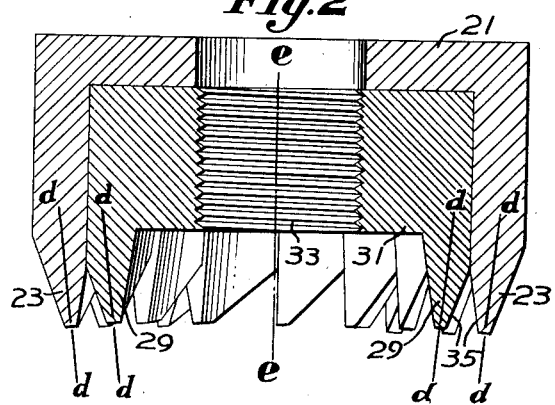
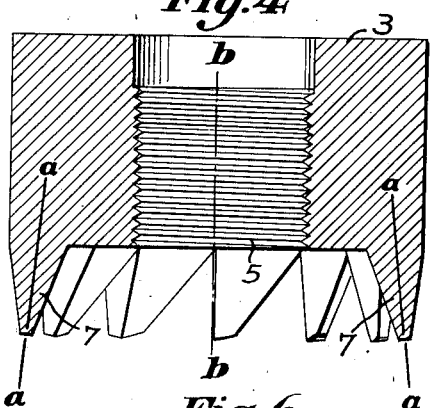
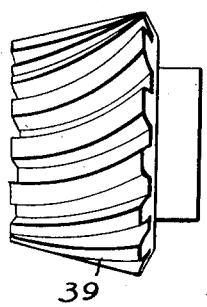
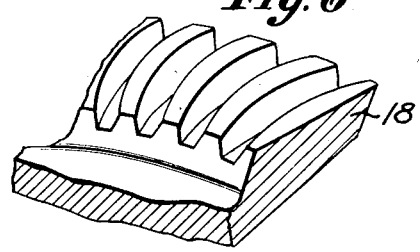
Inventor:
William C. Farnum
by Robt. P. Harris
Attorney W. C. FARNUM.
CUTTER.
APPLICATION FILED JULY 20, 1917.
1,338,822.
Patented May 4, 1920.
3 SHEETS—SHEET 2.
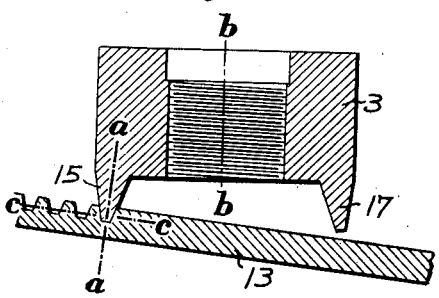
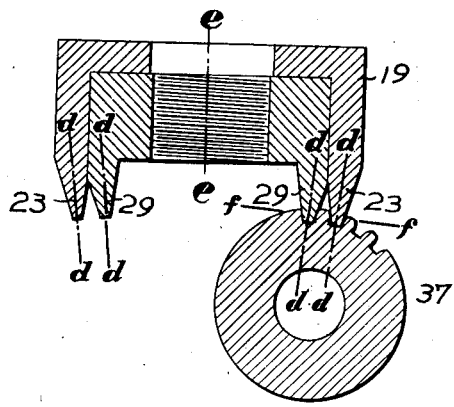
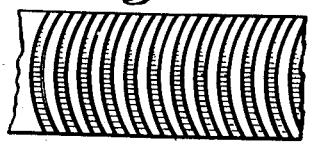
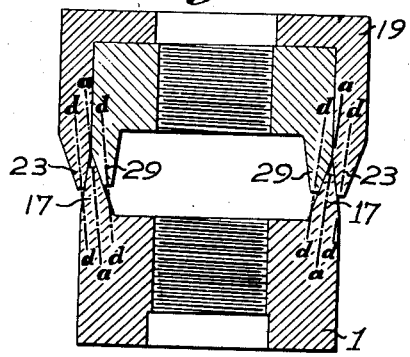
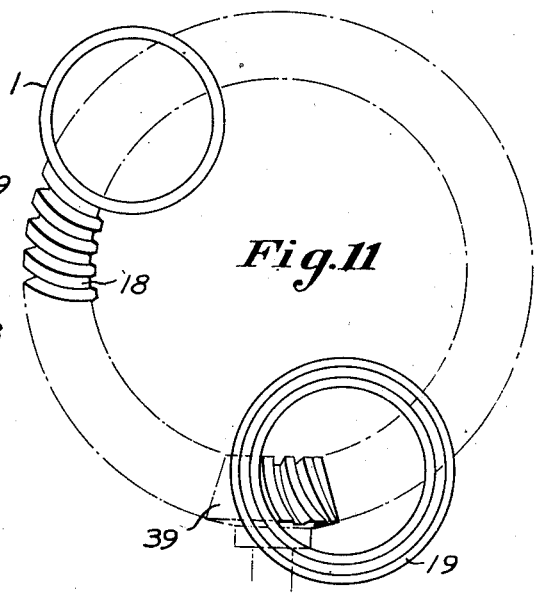
Inventor:
William C. Farnum,
by Rob't D. Hains,
Attorney

W. C. FARNUM.
CUTTER.
APPLICATION FILED JULY 20, 1917.

1,338,822.

Patented May 4, 1920.
3 SHEETS—SHEET 3.

Inventor:
by William C. Farnum
Robt. P. Sims
Attorney

UNITED STATES PATENT OFFICE.

WILLIAM C. FARNUM, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

CUTTER.

1,338,822.

Specification of Letters Patent.    Patented May 4, 1920.

Application filed July 20, 1917. Serial No. 181,772.

*To all whom it may concern:*

Be it known that I, WILLIAM C. FARNUM, a citizen of the United States, residing at Winchendon, county of Worcester, and State of Massachusetts, have invented an Improvement in Cutters, of which the following description, in connection with the accompanying drawings, is a specification, like characters on the drawings representing like parts.

The invention hereinafter described relates to cutters for producing teeth on gears and other elements.

Heretofore, as far as I am aware, rotary cutters for forming curved teeth of gears, have had their cutting teeth projecting in a direction such that they could not be used to form teeth of the desired radius of curvature in long racks, large gears and the like, since the inactive portion of the edge of the cutter would engage the rack or gear and prevent proper presentation of the cutter thereto.

The present invention, among other objects, provides a simple and effective cutter which will readily form curved teeth on a rack, gear or other element of any size.

The cutters described herein are of the type in which two cutters are used, one for forming the tooth spaces in a gear and the other for forming the teeth appropriate to fit the spaces produced by the first cutter. The character of the cutters is such that a pair of different cutters must be used in forming the teeth of mating gears.

The character of the invention may be best understood by reference to the following description of one good form thereof shown in the accompanying drawings, wherein:—

Figure 1 is a face view of a cutter for forming the opposed profiles of a tooth;

Fig. 2 is a transverse section taken on line 2—2 of Fig. 1;

Fig. 3 is a face view of a cutter for forming a tooth space suitable to receive the tooth formed by the other cutter;

Fig. 4 is a transverse section taken on line 4—4 of Fig. 3;

Fig. 5 is a side elevation of a bevel pinion having curved teeth produced by the cutter shown in Figs. 1 and 2;

Fig. 6 is a perspective view of a portion of a large bevel gear having curved tooth spaces produced by the cutter shown in Figs. 3 and 4;

Fig. 7 is a view showing the relation of the space forming cutter to a rack while cutting a space therein;

Fig. 8 is a view showing the relation of the tooth forming cutter to a pinion in producing a tooth thereon suitable to fit the space produced in the rack;

Fig. 9 is a plan of the rack shown in Fig. 7 showing the curved shape of the spaces between the teeth;

Fig. 10 is a view showing the teeth of the space producing cutter fitting between the teeth of the tooth forming cutter and illustrating the appropriate angles of the faces of the teeth of the cutters for producing mating gears;

Fig. 11 is a plan of a large bevel gear in mesh with a bevel pinion and showing the relation of the cutters to said gear and pinion in the production of the curved teeth thereon;

Figures 12, 13:
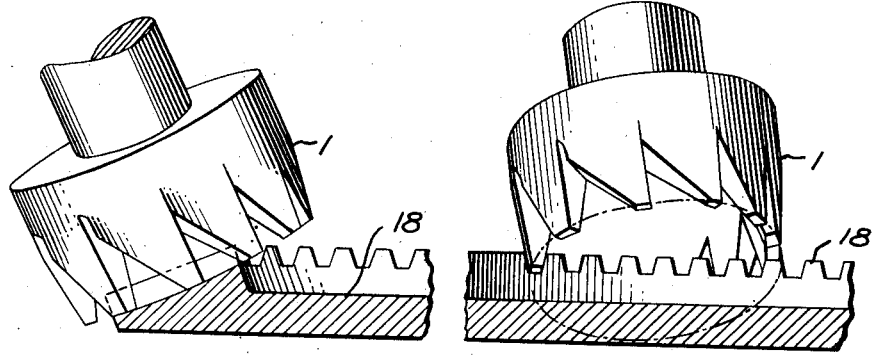
Fig. 12 is a perspective view showing the angular relation of the space forming cutter to the large bevel gear shown in Fig. 11.
Fig. 13 is a perspective view looking toward the left of the parts shown in Fig. 12.

Referring to Figs. 3, 4 and 7 of the drawing, 1 designates a cutter for producing a tooth space in a blank, and comprises a body 3 conveniently of cylindrical form and having a central bore 5 threaded for connection with the spindle of a gear cutting machine, such, for example, as shown in my copending application. This body is provided with a series of teeth 7 circumferentially disposed on said body, and in the present instance of the invention, arranged in a circle. These teeth may be tapered and project from one end of said body. Each tooth may have an advance cutting edge 9 and sides 11 converging rearwardly to provide the desired clearance in cutting.

Next will be described the characteristic of the teeth which enables the cutter to properly clear the blank during the cutting operation. To accomplish this, the teeth may be of general conical disposition, with their median lines *a—a* extending transversely to the axis $b$—$b$ of the body of the cutter. In the present instance of the invention, these median lines diverge outwardly from said axis.

The construction is such that the series of teeth may be rotated in a plane oblique to the plane of the pitch line of the blank in which teeth are to be cut, and at the same time the median lines of the teeth while actively cutting, may be substantially normal to the plane of the pitch line of the blank. For example, in Fig. 7 the cutter is shown in its proper relation to produce teeth on a rack 13. It will be noted that the median line $a$—$a$ of the tooth 15 which is actively cutting a space in the rack is normal to the pitch line $c$—$c$ of the rack, and the obliquity of the median line to the axis $b$—$b$ of the body of the cutter is sufficient to enable the diametrically opposite tooth 17 to clear the rack.

Since the cutter body rotates on its axis $b$—$b$, and the teeth of the cutter are moved in a curved path, they will produce a tooth space in the rack which is curved from side to side of the rack, as will be noted in Fig. 9.

The cutter described may have its teeth arranged on a circle having a radius suitable to produce the desired curvature of the tooth space, and may operate to cut the spaces in a rack of any desired length, without interference between the rack and the inactive portion of the cutter.

The rack may be supported by any suitable means, such for example, as a table and saddle on the knee of the machine. This will permit the rack to be fed inward toward the cutter until a tooth space is produced of the requisite depth. After one space has been produced, the blank may be indexed by adjustment of its support, and the next tooth space produced in a similar manner. Similarly, as many teeth as desired may be produced along the length of the rack blank.

The cutter described may also be used for forming teeth on a bevel gear, such, for example, as the gear 18 shown in Figs. 6, 11, 12 and 13, of relatively large diameter as compared with the diameter of the cutter. The teeth of the cutter rotate in a path in a plane oblique to the plane of the pitch circle of the gear, the obliquity being such that the inactive portion of the cutter clears the gear, and at the same time the median line of the tooth which is actively cutting a space in the gear blank is substantially normal to the plane of the pitch circle of the gear.

Next will be described a cutter for producing a tooth suitable to fit the space formed by the cutter described. Referring to Figs. 1, 2 and 8: 19 designates a cutter having a body 21 conveniently of general cylindrical form provided with an outer series of teeth 23 circumferentially disposed on said body, and in the present instance of the invention, arranged in a circle. These teeth may be tapered and project from one end of said body. Each tooth may have an advance cutting edge 25 and sides 27 converging rearwardly to provide the desired clearance in cutting.

This cutter is also provided with an inner series of teeth 29 conveniently mounted on a body 31 fitted into and secured to the body 21 and having a bore 33 threaded for connection with the spindle of a gear cutting machine, such, for example, as shown in said application.

The opposed inner edges 35 of the outer and inner series of teeth 23 and 29 are adapted to simultaneously form the opposed profiles of a tooth appropriate to fit the space cut in the rack. In order that this tooth may fit said space and the cutter may clear the blank on which the tooth is cut, the series of teeth 23 and 29 may have their median lines $d$—$d$ transverse to the axis $e$—$e$ of the body of the cutter. In the present instance of the invention, these median lines converge toward said axis.

In Fig. 8 the cutter is shown in its relation to a spur gear 37 while active in cutting a tooth therein. This gear may be mounted on a suitable support such, for example, as the table and saddle on the knee of the machine shown in said application. The table may be fed while the cutter is rotated, thereby causing the gear to roll across the teeth of the cutter and generate an involute tooth, as described in said application. The support may be set in a predetermined position to cut a tooth of the requisite depth, or it may be successively set in positions to bring the gear blank progressively nearer the cutter to cut the tooth of the requisite depth in stages. Upon completion of one tooth, the blank is indexed to bring it into position to cut the next tooth, and so on, until as many teeth are produced on the blank as desired.

The series of teeth of the cutter may rotate in paths in a plane which is oblique to a tangent $f$—$f$ to the pitch circle of the gear, but the obliquity of the median lines of the teeth is such that said lines are parallel to a radial line passing through the center of the tooth being cut. Thus, a tooth is properly formed radially of the blank.

The angles of the opposed sides 35 (Fig. 2) of a pair of the outer and inner teeth of the cutter 9 for producing the opposed profiles of a tooth are the same as the angles of the opposed sides of a tooth of the cutter 1 for producing a tooth space, but reversed so that the teeth 17 may fit between the teeth 23 and 29, as will be noted in Fig. 10. When the cutters are in this position, the median lines of the teeth of the cutter 1 will be parallel to the median lines of the teeth of the cutter 19. However, when the cutters are mounted on the spindle of the gear cutting machine in position to cut spaces and teeth, the median lines of the teeth of the cutter 1 will diverge outwardly from the axis of the cutter and the median lines of the teeth of the cutter 19 will converge toward the axis of the cutter.

Figure 14:
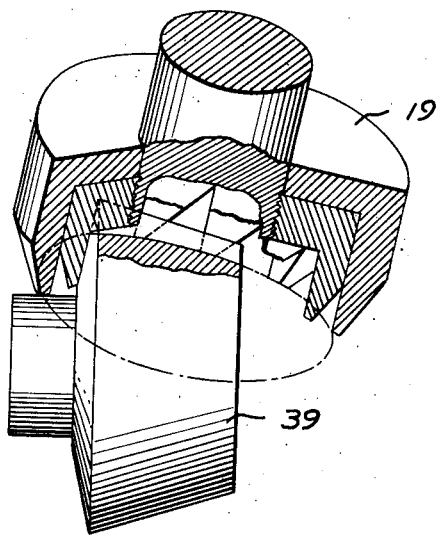
Fig. 14 is a perspective view showing the angular relation of the tooth forming cutter to the bevel pinion shown in Fig. 11.

The tooth forming cutter 19 may also be used to produce curved teeth on bevel gears, such, for example, as the gear 39 shown in Figs. 5, 11 and 14, provided the gear is sufficiently small in diameter to roll across the teeth of the cutter to generate involute teeth without interference from the inactive portion of the cutter. In Fig. 11 the cutter 19 is shown in appropriate relation to the bevel gear 39 for producing curved involute teeth thereon, said gear being shown in mesh with the large bevel gear 18, referred to.

Although the median line of a tooth of the space forming cutter is normal to the plane of the pitch line of the rack or gear while passing a point midway between the ends of a tooth space, said median line is not normal to said plane while the cutter tooth is passing through the tooth space toward and beyond said point, owing to the obliquity of the plane of the path of the cutter teeth to the plane of the pitch line of the rack or gear.

If the teeth of a tooth-forming cutter should have their median lines parallel with the axis of the body of the cutter, they would remain normal to the plane of the tangent of the pitch line of the gear during the entire passage of the cutter teeth across the gear in cutting the opposed profiles of a tooth.

Consequently, a tooth thus formed would not fit the space produced by the space-forming cutter. It is therefore essential where the median lines of the space cutter teeth diverge from the axis of the cutter, that the median lines of the teeth of the tooth-forming cutter shall converge toward the axis of the body of the cutter, and with an angularity corresponding to the angularity of the diverging median lines of the teeth of the space-forming cutter, in order to produce a tooth by one cutter which shall fit the space produced by the other cutter.

While the cutters selected herein as one embodiment of the invention have teeth with median lines extending obliquely to the axes of the cutters, the angle of these lines may vary according to conditions, and in some cases they may extend perpendicularly to the axes of the cutters; but in all cases, one of the cutters must be the reverse of the other in order to produce mating gears.

Also, where the median lines of the teeth extend obliquely to the axes of the cutters, the teeth of the space-forming cutter and tooth-forming cutter may converge and diverge respectively toward their axes if desired, instead of diverging and converging respectively toward said axes as described.

The term "gear" in the claims is to be understood in a broad comprehensive sense, generic to racks, pinions, gears, sectors and other toothed elements.

It will be understood that the invention is not limited to the specific embodiment shown, but that various deviations may be made therefrom without departing from the spirit and scope of the appended claims.

What is claimed is:—

1. A cutter comprising a rotary body and two series of teeth circumferentially disposed on said body, and having cutting edges for forming finished profiles of teeth on a blank, one of said series being located within the other, that the cutting edges of the two series of teeth may simultaneously form the finished opposed profiles of the tooth.

2. A cutter comprising a rotary body, and two concentric series of teeth disposed on said body for simultaneously forming two adjacent tooth spaces in a blank, the active cutting edges of the two series of teeth being shaped to form the opposed finished profiles of a tooth.

3. A cutter comprising a rotary body and a series of teeth circumferentially disposed on said body and having their median lines diverging toward the outer ends of said teeth, that said median lines of the active cutting teeth may be normal to the pitch line of the teeth cut in a blank while the inactive teeth of the cutter clear the blank.

4. A cutter comprising a rotary body and two series of teeth circumferentially disposed on said body having active edges for simultaneously forming the opposed profiles of a tooth, said teeth having median lines extending transversely to the axis of said body.

5. A cutter comprising a rotary body and two concentric series of teeth disposed on said body having active edges for simultaneously forming the opposed profiles of a tooth, said teeth being tapered outwardly and having their median lines transverse to the axis of said body.

6. A cutter comprising a rotary body having radially outer and inner teeth thereon having edges for simultaneously forming the opposed profiles of a tooth, said teeth having their median lines transverse to the axis of said body.

7. A cutter comprising a rotary body having outer and inner series of teeth circumferentially disposed on said body for simultaneously forming the opposed profiles of a tooth, said teeth having their median lines converging toward the axis of said body.

8. In combination, a pair of rotary cutters for producing dissimilar mating gears, one of said cutters comprising a body with teeth having their median lines diverging from the axis of said body; and the other of said cutters comprising a body with teeth having their median lines converging toward the axis of said body, the obliquity of said diverging and converging median lines being the same, but in opposite directions with respect to said axes.

9. In combination, a pair of rotary cutters for producing dissimilar mating gears, one of said cutters comprising a body with concentric rows of teeth thereon for simultaneously forming the opposed faces of a gear tooth; and the other cutter comprising a body with teeth thereon for producing a gear tooth space to fit said gear tooth, the teeth of one of said cutters having their median lines diverging from the axis of its body, and the teeth of the other cutter having their median lines converging toward the axis of its body.

10. In combination, a pair of rotary cutters for producing dissimilar mating gears, each cutter comprising a body with teeth projecting therefrom having their median lines transverse to the axis of said body, the teeth of said cutters projecting in different directions from their bodies, but the angle of the median lines of the teeth of one cutter with respect to its axis being the same as the angle of the median lines of the teeth of the other cutter with respect to its axis.

In testimony whereof, I have signed my name to this specification.

WILLIAM C. FARNUM.